United States Patent [19]
Iizuka et al.

[11] 3,985,400
[45] Oct. 12, 1976

[54] SKID CONTROL SYSTEM

[75] Inventors: Haruhiko Iizuka; Yasuhisa Takeuchi, both of Yokosuka, Japan

[73] Assignee: Nissan Motor Co., Ltd., Yokohama, Japan

[22] Filed: Sept. 18, 1975

[21] Appl. No.: 614,607

Related U.S. Application Data

[63] Continuation of Ser. No. 416,834, Nov. 19, 1973, abandoned.

[30] Foreign Application Priority Data

Nov. 20, 1972  Japan.............................. 47-115670

[52] U.S. Cl........................... 303/21 BE; 188/181 C
[51] Int. Cl.² .......................................... B60T 8/10
[58] Field of Search............ 188/181 C; 303/20, 21; 317/5; 324/161; 340/53, 62, 263; 307/10 R

[56] References Cited
UNITED STATES PATENTS

| | | | |
|---|---|---|---|
| 3,758,166 | 9/1973 | Kuwana et al...................... | 303/21 P |
| 3,767,270 | 10/1973 | Urban.............................. | 303/21 BE |
| 3,802,749 | 4/1974 | Carp et al........................ | 303/21 BE |
| 3,807,811 | 4/1974 | Nakamura et al............... | 303/21 BE |

*Primary Examiner*—Stephen G. Kunin

[57] ABSTRACT

A skid control system for fluid-actuated brake of a wheeled vehicle which comprises a release and reapplication signals generator for producing a release signal or a reapplication signal, a wheel velocity sensor, an actuating circuit for producing an actuating signal in accordance with the release signal, a reference wheel velocity signal generator for producing a reference wheel velocity signal in response to the actuation signal and the actual wheel velocity signal from the wheel velocity detector, a comparator for producing a gate signal when the actual wheel velocity signal voltage exceeds the reference wheel velocity signal voltage, an AND gate for passing therethrough the reapplication signal when triggered by the gate signal, and a brake pressure modulator for modulating the brake pressure in accordance with the release signal and the reapplication signal passed through the AND gate.

6 Claims, 7 Drawing Figures

SKID CONTROL SYSTEM

This is a continuation of application Ser. No. 416,834 filed Nov. 19, 1973 now abandoned.

The present invention relates to skid control systems and particularly relates to a skid control system including a control circuit for achieving the shortest braking distance.

Various skid control systems have been developed, which have the purpose to so control the braking moment that the maximum force transmitted between wheel and road is utilized. It is thus assured that for emergency braking operations, the shortest braking distance is achieved. A skid control system is generally composed of a brake pressure modulating device and a release and reapplication signals generator. The brake pressure modulating device is adapted to modulate the brake pressure in accordance with the release signal and the reapplication signal from the release and reapplication signals generator.

As is well known in the art, there are two types of brake pressure modulating devices, one type of which is adapted to change the brake pressure abruptly in accordance with the release or reapplication signal and the other is adapted to change the brake pressure gradually. The latter is advantageous in that it is capable of modulating the brake pressure with a relatively small amount of energy per unit time and in that it can desirably avoid skid conditions since the wheel velocity is gradually and smoothly varied. Difficulty has, however, been encountered in that when the brake pedal is abruptly and strongly depressed, the brake pressure rises too high for the release and reapplication signals generator incorporated with the latter type of brake pressure modulating device to operate adequately.

It is therefore a principal object of the present invention to provide a new and improved skid control system which eliminates the above-stated problem.

It is another object of the present invention to provide a new and improved skid control system which can suitably operate even when the brake pedal is abruptly and strongly depressed.

For a full understanding of the invention, a detailed description of a preferred embodiment of the invention will now be given with reference to the accompanying drawings; and the scope of the invention will be specifically defined in the claims.

Figure 1:
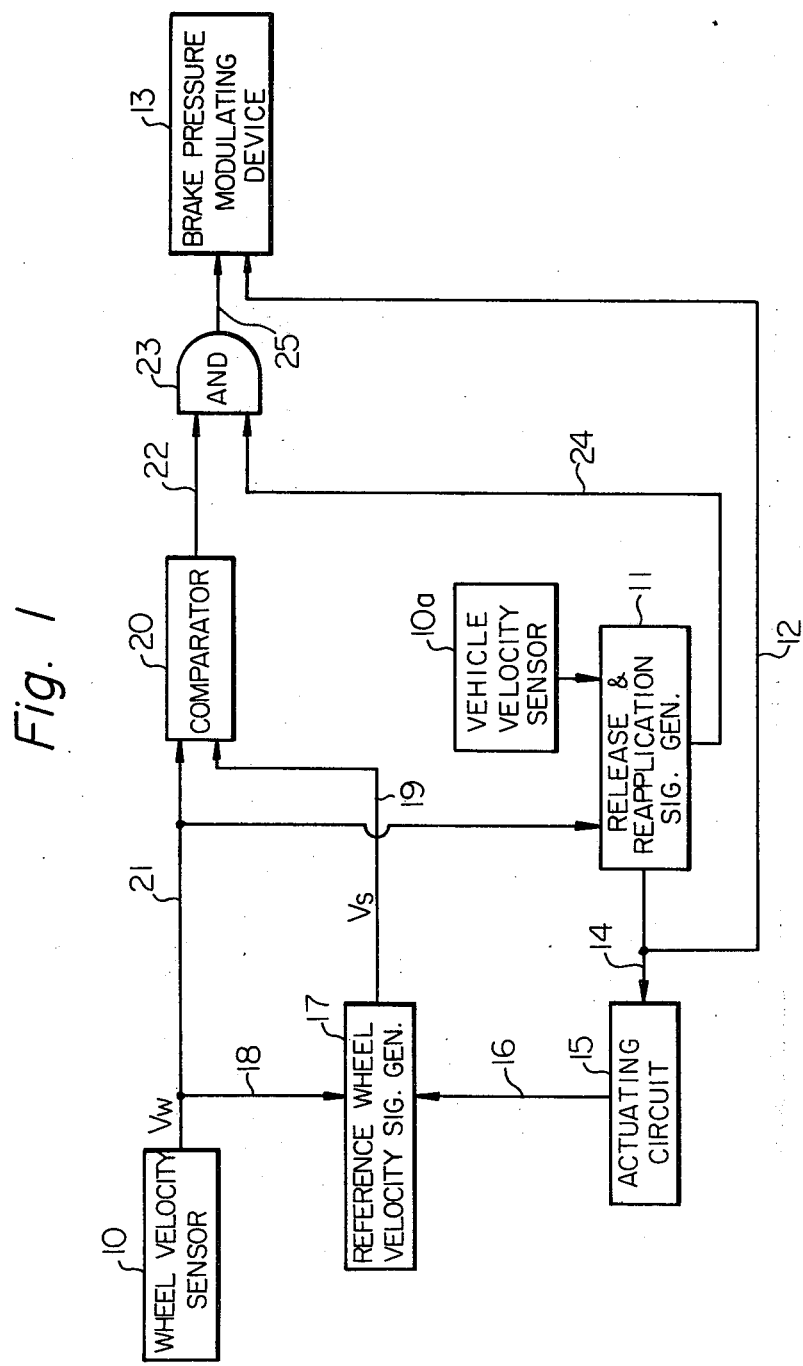
FIG. 1 is a schematic block diagram of a skid control system in accordance with the invention.

Referring now to the drawings and specifically to FIG. 1, there is shown a skid control system of the invention for a wheeled vehicle having a plurality of wheels and a brake system for at least one wheel. The skid control system comprises a wheel velocity sensor 10 arranged to produce an actual wheel velocity signal of a voltage ($V_w$) representing the actual velocity of at least one of the wheels, which is provided with a brake system, i.e. is braked. A release and reapplication signal generator 11 which is arranged in a well-known manner to produce repeatedly release pulses at instances when the brake pressure is to be reduced and reapplication pulses when the brake pressure is to be increased. The generator 11 receives voltage signals from the sensor 10 as well as from a vehicle speed sensor 10a, to produce a voltage signal representing actual vehicle velocity. A release pulse signal generated by the release and reapplication signal generator 11 appears on a line 12 which is connected to one input terminal (no numeral) of a brake pressure modulating device 13. The brake pressure modulating device 13 is arranged to decrease the brake pressure when it receives through the line 12 the release pulse signal. The release pulse signal is also applied through a line 14 to an actuating circuit 15 which then produces an actuating signal as long as it intermittently receives the release pulses. The actuating circuit may be a monostable multivibrator which retains its quasi-stable state for a sufficiently long time period. An output terminal of the actuating circuit 15 is connected by way of a line 16 to an input terminal (no numeral) of a reference wheel velocity signal generator 17 which has another input terminal (no numeral) connected through a line 18 to an output terminal (no numeral) of the wheel velocity sensor 10. The reference wheel velocity signal generator 17 is arranged to produce at its output terminal (no numeral) a reference wheel velocity signal of a voltage (Vs) in dependence on the actual wheel velocity signal from the sensor 10 and the actuating signal from the circuit 15. The output terminal of the reference wheel velocity signal generator 17 is connected through a line 19 to an input terminal (no numeral) of a comparator 20 which has another input terminal (no numeral) connected through a line 21 to the output terminal of the wheel velocity sensor 10. The comparator 20 is arranged to produce at its output terminal (no numeral) a gate signal when the voltage ($V_w$) of the actual wheel velocity signal exceeds the voltage (Vs) of the reference wheel velocity signal. The output terminal of the comparator 20 is connected through a line 22 to one input terminal (no numeral) of an AND gate 23 the other input terminal of which is connected through a line 24 to another output terminal (no numeral) of the release and reapplication signals generator 11. The signals generator 11 is arranged to produce on the line 24 a reapplication signal. The AND gate 23 has its output terminal (no numeral) connected through a line 25 to another input terminal (no numeral) of the brake pressure modulating device 13.

Referring now to FIGS. 2, 3A, 3B, 3C and 3D, the operation of the skid control system of FIG. 1 will be explained hereinbelow.

When the brake system of the wheeled vehicle is not operated, the release and reapplication signals generator 11 produces no signal so that the actuation circuit 15 does not produce the actuating signal. However, the wheel velocity sensor 10 continuously produces the actual wheel velocity signal which is applied to the reference wheel velocity signal generator 17. The reference wheel velocity signal generator 17 is so arranged that the reference wheel velocity signal has exactly the same voltage as that of the actual wheel velocity signal when the actuating signal is not applied to the generator 17.

Figure 2:
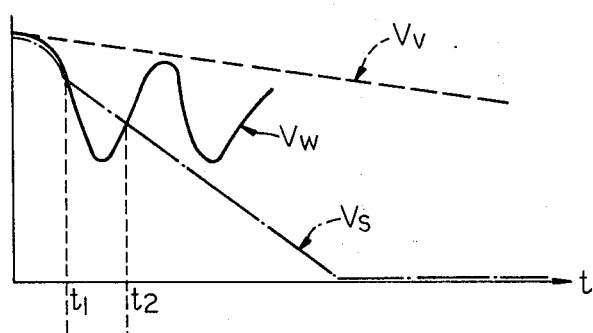
FIG. 2 is a diagram showing curves depicting operation of the system of FIG. 1.

When the brake pressure of the brake system increases due to depression of the brake pedal, the wheel velocity signal depicted by a solid curve Vw in FIG. 2 is initially decreased in response to the slow down of the wheel. When the wheel velocity is reduced to a certain degree at a moment $t_1$, the signal generator 11 produces a release pulse at the moment $t_1$ which lasts for a desired time period as seen from FIG. 3A. The release pulse is applied through the line 12 to the brake pressure modulating device 13 which then commences to decrease the brake pressure. It is now to be noted that since the brake pressure is gradually reduced by the brake pressure modulating device 13, the wheel velocity still continues to decrease as seen from FIG. 2. The release pulse is, on the other hand, applied through the line 14 to the actuating circuit 15 which then produces the actuating signal. The actuating signal is applied through the line 16 to the reference wheel velocity signal generator 17. The signal generator 17 produces the reference wheel velocity signal which is now of a reduced voltage the reduction being proportional to time $t$ as illustrated by a phantom line Vs in FIG. 2.

Figure 3A:
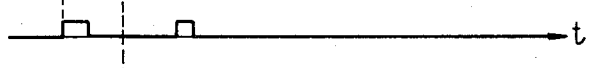
FIGS. 3A, 3B, 3C and 3D are diagrams showing pulse signals appearing in the system of FIG. 1.
Figure 3B:
Figure 3C:
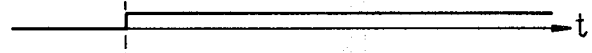
Figure 3D:

The signal generator 11, on the other hand, produces a reapplication pulse at a time when the wheel velocity commences to increase as shown in FIG. 3B. Since, at this instant, the actual wheel velocity signal voltage is smaller than the reference wheel velocity signal voltage as seen from FIG. 2, the comparator 20 does not produce the gate pulse signal, so that the AND gate does not pass therethrough the reapplication pulse signal. When the actual velocity signal voltage exceeds the reference wheel velocity signal voltage at a moment $t_2$, the comparator 20 produces the gate pulse signal having a waveform as shown in FIG. 3C. Thus, the AND gate 23 passes there-through the reapplication signal and, accordingly, the reapplication signal passed through the gate 23 has a waveform as illustrated in FIG. 3D.

It should be appreciated that since the skid control system of the invention retards the initial brake pressure reapplication timing so as to prevent the brake pressure from becoming too high, the system is capable of operating effectively and smoothly, even if the brake pedal is abruptly and strongly depressed.

Figure 4:
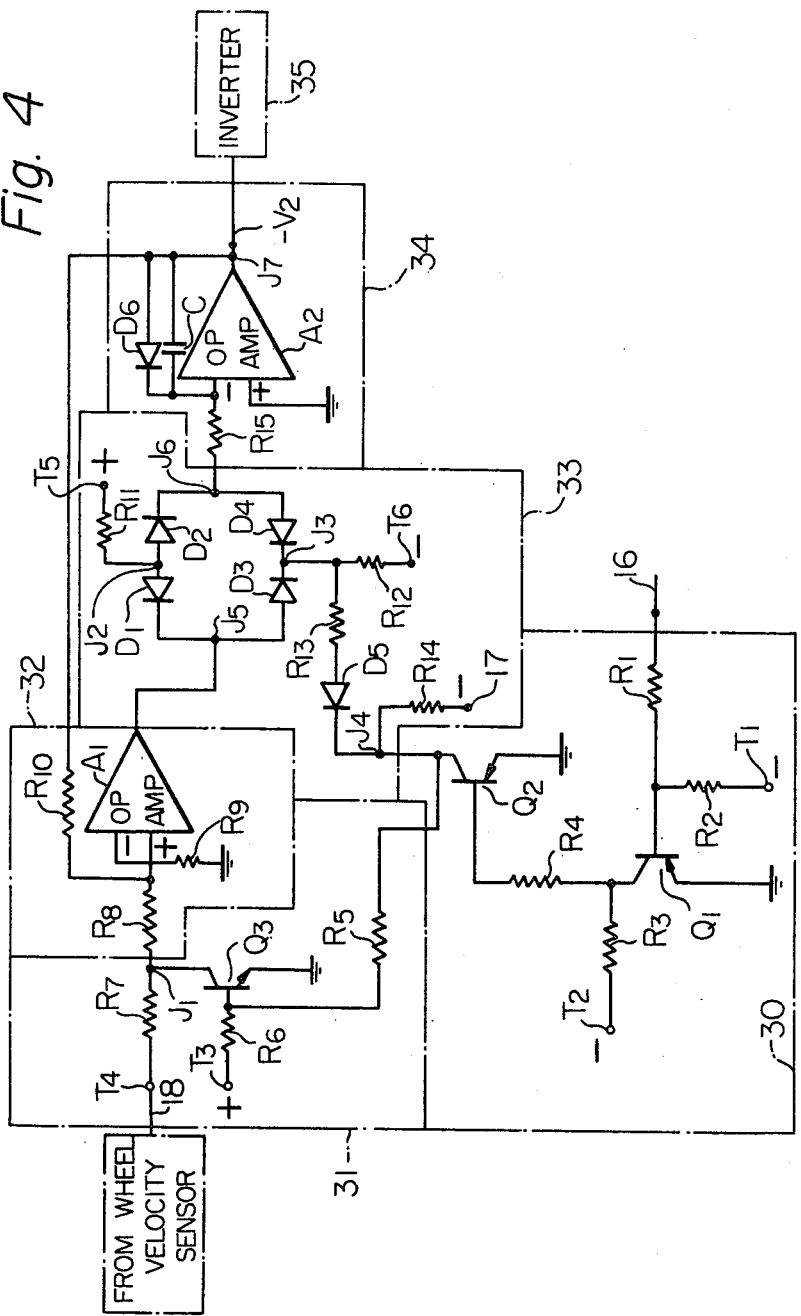
FIG. 4 is a partial preferred circuit arrangement of the system of FIG. 1 in detail.

In FIG. 4, a preferred circuit arrangement for the reference wheel velocity signal generator 17 is illustrated, which comprises a relaying circuit 30, a gate circuit 31, a comparator 32, a selectively connecting circuit 33, an integrator 34, and an inverter 35. The relaying circuit 30 includes a transistor $Q_1$ having its emitter grounded and its base connected through a resistor $R_1$ to the line 16 leading from the actuating circuit 15, and through a resistor $R_2$ and a terminal $T_1$ to a constant negative voltage. The collector of the transistor $Q_1$ is connected through a resistor $R_3$ and a terminal $T_2$ to a constant negative voltage source and through a resistor $R_4$ to the base of a transistor $Q_2$. The transistor $Q_2$ has its emitter grounded.

The gate circuit 31 includes a resistor $R_5$ connected between the collector of the transistor $Q_2$ and the base of a transistor $Q_3$. The base of the transistor $Q_3$ is further connected through a resistor $R_6$ and a terminal $T_3$ to a constant positive voltage source. The transistor $Q_3$ has its emitter grounded and its collector connected through a resistor $R_7$ to a terminal $T_4$ which is connected to the line 18 leading from the wheel velocity sensor 10.

The comparator 32 includes an operational amplifier $A_1$ having its non-inverting or direct input connected through a resistor $R_8$ to the collector of the transistor $Q_3$ via a joint $J_1$ and its inverting input grounded through a resistor $R_9$. The comparator 32 further includes a resistor $R_{10}$ having its one terminal connected to the non-inverting input of the amplifier $A_1$.

The selectively connecting circuit 33 includes diodes $D_1$ and $D_2$ having their anodes connected with each other, and diodes $D_3$ and $D_4$ having their cathodes connected with each other and their anodes respectively connected to the anodes of the diodes $D_1$ and $D_2$. A resistor $R_{11}$ has its one terminal connected to the anodes of the diodes $D_1$ and $D_2$ via a joint $J_2$ and its other terminal connected through a terminal $T_5$ to a constant positive voltage source. A resistor $R_{12}$ has its one terminal connected to the cathodes of the diodes $D_3$ and $D_4$ via a joint $J_3$ and its other terminal connected through a terminal $T_6$ to a constant negative voltage source. A diode $D_5$ has its anode connected through a resistor $R_{13}$ to the joint $J_3$ and its cathode connected through a resistor $R_{14}$ and a terminal $T_7$ to a constant negative voltage source and it is also connected to the collector of the transistor $Q_2$ via a joint $J_4$. The output of the operational amplifier $A_1$ is connected to the cathode of the diode $D_1$ and the anode of the diode $D_3$ via a joint $J_5$.

The integrator 34 includes an operational amplifier $A_2$ having its non-inverting input directly grounded and its inverting input connected through a resistor $R_{15}$ to the cathode of the diode $D_2$ and to the anode of the diode $D_4$ via a joint $J_6$. A capacitor C has its one terminal connected to the inverting input of the operational amplifier $A_2$ and the other terminal connected to the output of the operational amplifier $A_2$ via a joint $J_7$. A diode $D_6$ has its cathode connected to the inverting input of the amplifier $A_2$ and its anode connected to the joint $J_7$. The joint $J_7$ is further connected to the other terminal of the resistor $R_{10}$ of the comparator 32.

The inverter 35 has its input connected to the joint $J_7$ of the integrator 34 and is arranged to produce an output having a polarity opposite to that of its input signal from the integrator 34.

When, in operation, the actuation signal is not applied to the relaying circuit 30, the transistor $Q_1$ is rendered conductive so that the transistor $Q_2$ is non-conductive. Since, in this instance, current flows from the terminal $T_3$ through the resistors $R_6$, $R_5$ and $R_{14}$ to the terminal $T_7$, the potential at the base of the transistor $Q_3$ is relatively low rendering the transistor $Q_3$ non-conductive. Thus, the actual wheel velocity signal from the sensor 10 can be applied through the resistor $R_7$ to the comparator 32. It is now to be noted that an output voltage of the operational amplifier $A_2$ is constantly of zero or negative voltage due to the operation of the circuit from the diode $D_6$ through the resistor $R_{15}$ and the diode $D_4$ to the resistor $R_{12}$. The output voltage of the amplifier $A_2$ is applied to the non-inverting input of the operational amplifier $A_1$ through the resistor 10. When, in this instance, the absolute voltage (Vw) of the wheel velocity signal is smaller than that of the output voltage signal of the amplifier $A_2$, the operational amplifier $A_1$ produces a negative saturation voltage which is applied to the joint $J_5$ of the circuit 33, so that the potential at the joint $J_2$ is considerably reduced to render the diode $D_2$ non-conductive. The diode $D_3$ is also non-conductive. Since, in this instance, the transistor $Q_2$ is non-conductive, the input of the integrator 34 is connected through resistors $R_{13}$ and $R_{14}$ of relatively low resistances and the terminal $T_7$ to the constant negative voltage, the output voltage of the integrator rapidly approaches zero voltage, that is, the absolute voltage of the output voltage of the integrator 34 is reduced, until the absolute value ($V_w$) exceeds that of the output voltage of the integrator 34, whereby the comparator 32 produces a positive saturation voltage which is applied to the joint $J_5$ of the circuit 33. In this instance, the diode $D_1$ is non-conductive and a large current flows through the diode $D_3$ and the resistor $R_{12}$. Accordingly, the diode $D_4$ is rendered non-conductive and the input of the integrator 34 is connected through the diode $D_2$ and the resistor $R_{11}$ of a relatively small resistance to the constant positive voltage source, whereby the output voltage of the integrator 34 is further reduced, that is the absolute value of the output voltage of the integrator 34 increases until the absolute value of the output voltage of the integrator 34 exceeds that ($V_w$) of the actual wheel velocity signal. The above-mentioned operation will be repeated, resulting in the absolute value of the output voltage of the integrator 34 becoming equal to that ($V_w$) of the voltage of the actual wheel velocity signal. Thus, the output voltage of the integrator 34 can be denoted by $-V_s$.

When the actuation signal is applied to the relaying circuit 30, the transistor $Q_1$ is rendered non-conductive so that the transistor $Q_2$ becomes conductive. Accordingly, the base potential of the transistor $Q_3$ rises, so that the transistor $Q_3$ becomes conductive preventing the actual wheel velocity signal from being applied to the comparator 32. Since, in this instance, the comparator 32 produces the negative saturation voltage, the potential at the joint $J_2$ decreases so as to render the diode $D_2$ non-conductive and, on the other hand, the diode $D_4$ is conductive. Furthermore, since the transistor $Q_2$ is conductive, the potential at the joint $J_4$ is sufficiently high to cause the diode $D_5$ to be non-conductive, the input terminal of the integrator 34 being connected by way of the diode $D_4$ and the resistor $R_{12}$ of a relatively large resistance to the constant negative voltage source, the output voltage ($-V_s$) approaches zero voltage at a constant rate and is finally fixed at zero voltage by the operation of the diode $D_6$. The output voltage ($-V_s$) of the integrator 34 is applied to the inverter 35 which then produces the voltage signal of the voltage ($V_s$), which varies as illustrated by the phantom line Vs in FIG. 2.

What is claimed is:

1. A skid control system comprising a vehicle velocity sensor, a wheel velocity sensor, a brake pressure release and reapplication signal generator, and a brake pressure modulating means for modulating the brake pressure in dependence on the release and reapplication signals, which is characterized by;
    an actuating circuit to produce an actuating voltage signal in response to the release signal;
    reference wheel velocity signal generating means for producing a reference wheel velocity voltage signal in response to said actuating voltage signal and the wheel velocity signal;
    a first comparator to produce a gate voltage signal when said wheel velocity signal exceeds said reference wheel velocity voltage signal; and
    a gate to pass therethrough said brake pressure reapplication signal when triggered by said gate voltage signal.

2. A skid control system as claimed in claim 1, in which said actuating circuit comprises a monostable multivibrator.

3. A skid control system as claimed in claim 1, in which said reference wheel velocity voltage signal generating means comprises:
    a relaying circuit connected to said actuating circuit for relaying said actuating voltage signal;
    an integrator;
    an inverter for inverting the polarity of the output of said integrator;
    selectively connecting means for connecting a positive voltage source through a first relatively small resistor to an input terminal of said integrator when triggered by a positive voltage signal; for connecting a negative voltage source through a second relatively small resistor to said input terminal of said integrator when triggered by both a negative voltage signal and said actuating voltage signal relayed by said relaying circuit; and for connecting said negative voltage source through a relatively large resistor to said input terminal of said integrator when triggered only by said negative voltage signal;
    a second comparator for producing said positive voltage signal when the absolute value of the output voltage of said integrator is lower than that of the voltage of said actual wheel velocity voltage signal and for producing said negative voltage signal when the absolute value of the output voltage of said integrator exceeds that of the voltage of said actual wheel velocity voltage signal; and
    gate means for preventing said actual wheel velocity voltage signal from being applied to said second comparator when triggered by said actuating voltage signal relayed by said relaying circuit.

4. A skid control system as claimed in claim 3, in which said integrator comprises a first operational amplifier having its non-inverting input grounded, a capacitor connected across the inverting input and output of said first operational amplifier, a first diode having its anode connected to said output of said first operational amplifier and its cathode connected to said inverting input of said first operational amplifier, and a first resistor having its one terminal connected to said inverting input of said first operational amplifier.

5. A skid control system as claimed in claim 4, in which said second comparator comprises a second operational amplifier having its inverting input grounded through a resistance, a second resistor connected to said output of said first operational amplifier and the non-inverting input of said second operational amplifier, and a third resistor having its one terminal connected to said non-inverting input of said second operational amplifier.

6. A skid control system as claimed in claim 5, in which said selectively connecting means comprises:
    second and third diodes having their anodes connected through said first relatively small resistor to said positive voltage source, the cathode of said second diode being connected to the output of said second operational amplifier and the cathode of said third diode being connected to the other terminal of said first resistor;
    fourth and fifth diodes having their cathodes connected through said relatively large resistor to said negative voltage source and through said second relative small resistor to said negative voltage source, the anode of said fourth diode being connected to said cathode of said second diode and the anode of said fifth diode being connected to said cathode of said third diode.

* * * * *